Patented Oct. 10, 1933

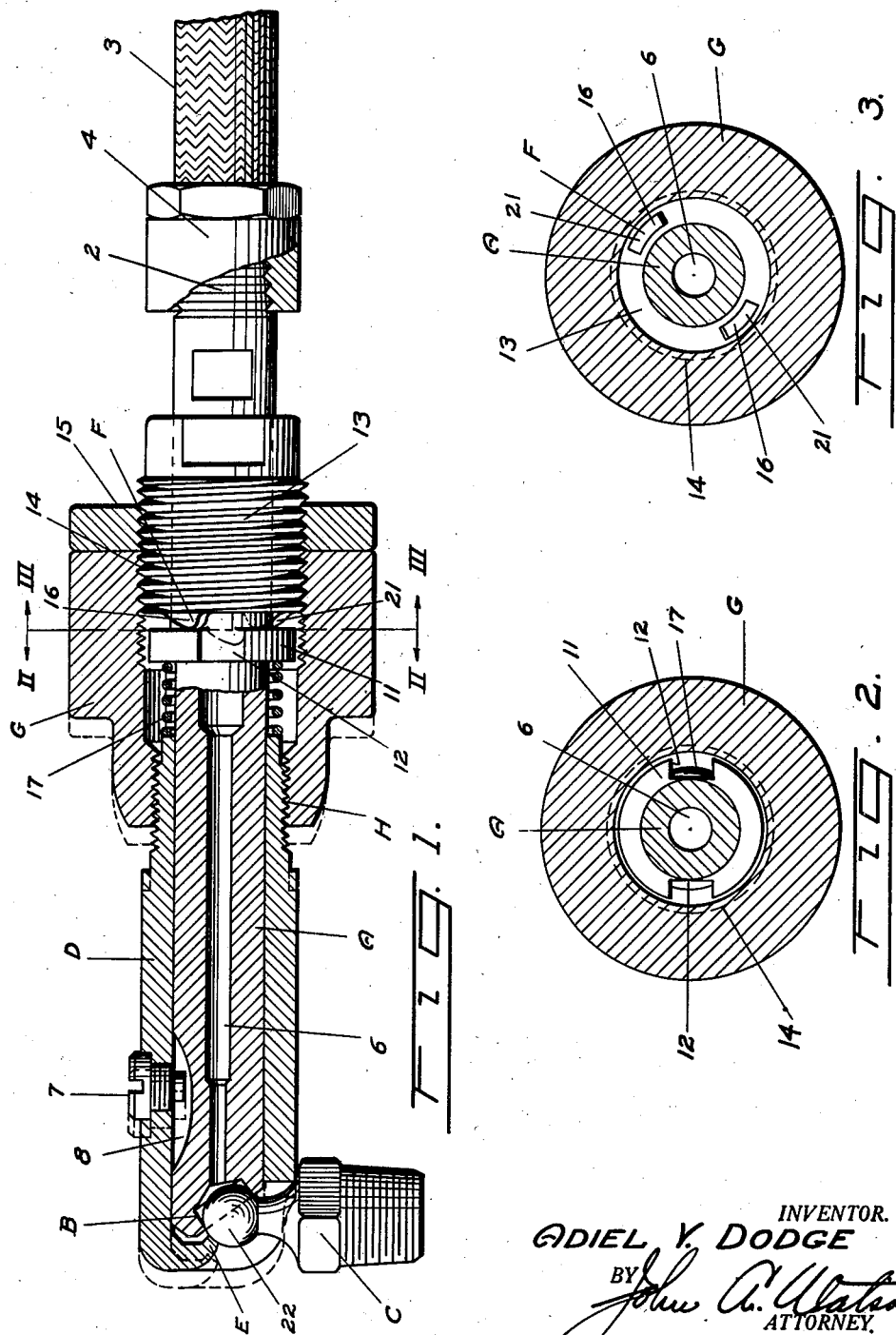

1,929,628

UNITED STATES PATENT OFFICE 1,929,628

LUBRICATING DEVICE

Adiel Y. Dodge, South Bend, Ind., assignor to The Lubrication Corporation, South Bend, Ind., a corporation of Delaware Application June 27, 1932. Serial No. 619,498

5 Claims. (Cl. 285—144)

This invention relates to improvements in lubricating devices and more particularly to lubricant discharge nozzles of the type to be clamped upon the head of a lubricant receiving nipple or fitting for conducting lubricant thereto under relatively high pressures.

An object of my invention is to provide a clamp type lubricant discharge nozzle wherein during the clamping operation the clamping member of the nozzle may be first rapidly moved to engage the head of a lubricant receiving nipple or fitting and thereupon, by continued and uninterrupted movement of the actuating sleeve, be moved slowly and with multiplied force thereby attaining speed of operation accompanied by high clamping pressure.

Another object is to provide a clamp type lubricant discharge nozzle which may be applied to the lubricant receiving nipple or fitting and clamped thereto by the use of one hand thereby permitting the operator the use of his other hand for any other concurrent duties, such as the actuation of the control valve of the dispenser apparatus with which the nozzle may be connected.

A further object is to provide a clamp type lubricant discharge nozzle in which the manually actuated mechanism for operating the clamping member may be adjusted at will to provide minimum lost motion in the closing of the clamping jaws upon the fitting head.

Other objects, the advantages, and uses of the invention, will be or should become apparent after reading the following description and claims and after consideration of the accompanying drawing forming a part of this specification, in which:

Fig. 1 is a sectional view of a clamp type lubricant discharge nozzle constructed in accordance with my invention;

Fig. 2 is a sectional view along the line II—II of Fig. 1; and

Fig. 3 is a sectional view along the line III—III of Fig. 1.

In general my improved clamp type discharge nozzle comprises a conduit A having a discharge orifice B fashioned to partially receive the head of a lubricant receiving nipple or fitting C, a tubular member D telescopically mounted relative to the conduit A the forward end of which is fashioned to provide a clamping jaw E engageable with the opposed side of the head of the fitting C when in registration or engagement with the discharge orifice B, cam mechanism F operable through the rotation of a sleeve G to cause relative movement between the members A and D and screw threads H formed on the cooperating parts of the sleeve G and the member D for causing relative movement between the member D and conduit A during and subsequent to the functioning of the cam mechanism F.

Referring particularly to Fig. 1 of the drawing, the conduit A may be formed at its rearward end with screw threads 2 by means of which the conduit may be connected to a pressure feed lubricant dispensing apparatus through the medium of a flexible lubricant conducting hose 3 having an internally threaded coupling member 4 engageable with the screw threads 2. Lubricant may pass through an uninterrupted central bore 6 of the conduit the outer end of which communicates directly with the discharge orifice B.

In order that the clamping jaw E may maintain proper relationship to the discharge orifice B at all times a stud screw 7 is disposed through the side wall of the member D and extended within a slot 8 formed in the outer wall of the conduit A whereby relative longitudinal movement between the conduit and clamping member D may take place but relative rotational movement between the parts may not occur.

The cam mechanism F includes an annular flange 11 formed on the outer wall of the conduit A having diametrically opposed portions cut away as shown at 12. The balance of the cam mechanism F comprises an externally threaded member 13, annular in cross-section, slidably mounted upon the conduit A and secured by threaded engagement 14 to the inner wall of the sleeve G. A lock nut 15 may be employed to lock the member 13 and sleeve against relative movement when adjusted to their proper operative relationship. The forward end of the member 13 is formed with a pair of diametrically opposed cam members 16 extending forwardly toward the flange 11 on the conduit A. A compression spring 17 is disposed concentric to and about the conduit A and arranged to bear at opposite ends against the adjacent face of the flange 11 and the end of the tubular clamping member D respectively. The spring 17 functions to urge the clamping member D with its jaw E away from the forward end of the conduit A thus normally maintaining the nozzle in readiness to be initially engaged with the head of the lubricant receiving fitting C but may yield under action of the cam mechanism F and screw threads H to permit relative movement between the clamping member and the conduit to clamp the nozzle upon the head of the fitting.

The cam members 16 on the member 13 are of such size and shape as to fall within the cut-away portions 12 of the flange 11 under influence of the spring 17 when the cams are in registration therewith as when the nozzle is in its unclamped position. This position of the cam members 16 is indicated in dotted lines in Fig. 1. It will be noted that the forward end of each of the cam members 16 is inclined gradually, as shown at 21, whereas the rearward end falls abruptly to the adjacent surface of the member 13. This arrangement causes the cams to ride rearwardly out of the cut-away portions 12 of the flange 11 upon right hand rotation of the sleeve G relative to the clamping member D until the cams bear directly upon the rearward side wall of the flange 11. This latter position of the parts is shown in full lines in Fig. 1.

Prior to clamping the nozzle upon the head 22 of the lubricant receiving fitting C the parts are in the relative positions indicated in dotted lines in Fig. 1. The operator may then move the nozzle toward the fitting head until the head is partially received within the discharge orifice B to establish contact therewith. The sleeve G may then be rotated to cause immediate action of the cam members 16 to move the member 13, sleeve G and clamping member D with its clamping jaw E rearwardly along the conduit an amount equal to the depth of the cam member. At this time the parts may appear, as shown in full lines in Fig. 1, with the jaw E just clear of or actually contacting the rearward side of the fitting head 22. Continued rotation of the sleeve G relative to the member D and conduit A may thereupon utilize the relatively high force multiplying effect of the screw threads H to draw the member D rearwardly along the conduit A to cause the clamping jaw E to bear with great force upon the fitting head, thus providing a highly efficient lubricant tight seal between the head of the fitting and the contacting portions of the walls of the discharge orifice B. Reverse movement of the sleeve G will serve to unclamp the nozzle from the fitting and the parts may be again restored to their dotted line positions with the nozzle in readiness for further use.

It will be apparent that I have provided in my improved clamp type discharge nozzle mechanism which first translates any predetermined manual force to force wherein the pressure is low but the amplitude of movement great and thereafter to force wherein the pressure is high and the amplitude of movement small, thereby providing for ample clearance between the clamping elements prior to engagement with the fitting without loss of time in closing the elements during the clamping function.

While I have illustrated herein my improved nozzle as applied to a lubricant receiving fitting C having a substantially spherical head it should be understood that the nozzle may be constructed for application to any type of lubricant fitting regardless of the contour of the head and such alterations made in the size and shape of the jaw E and the discharge orifice B as is necessary to accommodate the nozzle to the fitting and that the embodiments of the invention herein set forth are presented for the purpose of illustration only, and various other changes may be made without departing from the spirit of the invention and the scope of the appended claims.

I claim:

1. A lubricant discharge nozzle comprising, a conduit having a discharge orifice at one end adapted for registration with the head of a lubricant receiving fitting, a clamping member for clamping said conduit upon said fitting head, and means for operating said clamping member to first cause the clamping member to quickly approach the fitting and thereupon to move slowly toward the fitting with increased pressure, said means including a rotatable sleeve having a cam and cooperating screw threads associated with said conduit and said clamping member.

2. A lubricant discharge nozzle comprising, a conduit having one end adapted for engagement with a lubricant receiving fitting and the other end adapted for connection to a source of lubricant supply, a clamping member movable relative to said conduit for clamping said conduit in engagement with said fitting, a sleeve adapted to rotate about the axis of said conduit, cam mechanism operable upon rotation of said sleeve for causing relative movement between said clamping member and said conduit and screw threads associated with said sleeve and said clamping member operable through said cam mechanism to cause relative movement between the clamping member and the conduit under increased pressure.

3. A lubricant discharge nozzle comprising, a conduit having one end adapted for engagement with a lubricant receiving fitting and the other end adapted for connection to a source of lubricant supply, a clamping member movable relative to the conduit for clamping said conduit in engagement with said fitting, a cam member engageable with said conduit, and a manually operated member for moving said cam member, said manually operated member being coupled to said clamping member through the medium of screw threads whereby initial movement of said manually operated member may cause said cam to move relative to said conduit to cause a corresponding relative movement between said clamping member and said conduit and whereby continued operation of said manually operated member may further said relative movement through the medium of said screw threads independently of said cam.

4. A lubricant discharge device comprising, a nozzle adapted for engagement with a lubricant receiving fitting, a clamping member slidably mounted on said nozzle for clamping said nozzle upon said fitting, a cam movable along an annular path concentric to the axis of said nozzle for operating said clamping member, and a manually operable member having threaded engagement with said clamping member for moving said cam.

5. A lubricant discharge nozzle comprising, a conduit having one end adapted for engagement with a lubricant receiving fitting and its other end adapted to be connected to a source of lubricant supply, a clamping member movable along the axis of said conduit for clamping said conduit upon said fitting, a cam movable along an annular path about the axis of said conduit for causing relative movement between said clamping member and said conduit, and manually operable means having threaded engagement with said clamping member for moving said cam.

ADIEL Y. DODGE.